(12) United States Patent
Kobayashi et al.

(10) Patent No.: US 12,281,952 B2
(45) Date of Patent: Apr. 22, 2025

(54) TORQUE MEASURING DEVICE AND MANUFACTURING METHOD THEREOF

(71) Applicants: NSK LTD., Tokyo (JP); PROTERIAL, LTD., Tokyo (JP)

(72) Inventors: Masahiro Kobayashi, Fukuroi (JP); Kota Fukuda, Fukuroi (JP); Hisayoshi Fukui, Fukuroi (JP); Takahiro Odera, Fukuroi (JP); Haruhiko Tanno, Fukuroi (JP); Yoshinori Kubo, Tokyo (JP); Naoki Futakuchi, Tokyo (JP); Ken Okuyama, Tokyo (JP); Teruyuki Nakamura, Tokyo (JP)

(73) Assignees: NSK LTD., Tokyo (JP); PROTERIAL, LTD., Tokyo (JP)

( * ) Notice: Subject to any disclaimer, the term of this patent is extended or adjusted under 35 U.S.C. 154(b) by 262 days.

(21) Appl. No.: 18/176,098

(22) Filed: Feb. 28, 2023

(65) Prior Publication Data
US 2023/0280223 A1 Sep. 7, 2023

(30) Foreign Application Priority Data

Mar. 1, 2022 (JP) .................................. 2022-031028

(51) Int. Cl.
*G01L 3/10* (2006.01)
(52) U.S. Cl.
CPC .............. *G01L 3/102* (2013.01); *G01L 3/108* (2013.01)

(58) Field of Classification Search
CPC ........ G01L 3/102; G01L 3/108; G01L 25/003
See application file for complete search history.

(56) References Cited

U.S. PATENT DOCUMENTS 5,307,690 A * 5/1994 Hanazawa .............. G01L 3/105
73/862.331
6,591,699 B2 * 7/2003 Ueno ...................... G01L 5/221
73/862.331

(Continued)

FOREIGN PATENT DOCUMENTS

JP 2018-48956 A 3/2018

*Primary Examiner* — Freddie Kirkland, III
(74) *Attorney, Agent, or Firm* — Sughrue Mion, PLLC

(57) ABSTRACT

The manufacturing method includes: performing testing of samples having the same configuration as the torque measuring device to be manufactured to find a coil balance $C_b$ that is a ratio $(R1 \times R3)/(R2 \times R4)$ of a product $R1 \times R3$ of resistance values R1 and R3 of one pair of opposite sides of the four sides of a bridge circuit 8, and a product $R2 \times R4$ of resistance values R2 and R4 of another pair of opposite sides of the four sides, and a temperature change rate $V_T$ of output voltage Vo of a sensor portion 4, and acquiring a relationship X between the coil balance $C_b$ and the temperature change rate $V_T$ from the test results; and measuring the resistance values R1, R2, R3, R4 of the four sides to find the coil balance $C_b$ to find the temperature change rate $V_T$ from the relationship X for the torque measuring device to be manufactured.

3 Claims, 9 Drawing Sheets

(56) References Cited

U.S. PATENT DOCUMENTS

| | | | |
|---|---|---|---|
| 9,618,408 B2* | 4/2017 | Lu | G01L 3/102 |
| 10,345,167 B2* | 7/2019 | Lu | G01L 3/105 |
| 11,495,733 B2* | 11/2022 | Sugiyama | G01L 1/125 |
| 2005/0005714 A1* | 1/2005 | Koga | G01L 3/105 |
| | | | 73/862.325 |
| 2007/0147632 A1* | 6/2007 | Gyotoku | H04N 5/9202 |
| | | | 386/E5.021 |
| 2014/0320058 A1* | 10/2014 | Takagi | H02K 41/031 |
| | | | 318/632 |
| 2016/0252415 A1* | 9/2016 | Lu | G01L 3/102 |
| | | | 73/862.333 |
| 2021/0074905 A1* | 3/2021 | Sugiyama | G01K 7/203 |

* cited by examiner

TORQUE MEASURING DEVICE AND MANUFACTURING METHOD THEREOF

CROSS REFERENCE TO RELATED APPLICATIONS

This patent application claims the benefit of JP Patent Application No. 2022-031028 filed Mar. 1, 2022. The above application is incorporated by reference herein.

FIELD

The present disclosure relates to a torque measuring device and manufacturing thereof.

BACKGROUND

In recent years, in the field of automobiles, the development of systems that measure torque transmitted by a rotating shaft of a power train, or in other words, a power transmission mechanism, use the measurement results to control output of an engine or an electric motor that is a power source, and execute speed change control of a transmission is advancing.

Conventionally, a magnetostrictive torque measuring device is known as a device for measuring torque transmitted by a rotating shaft. A magnetostrictive torque measuring device is configured to measure torque being transmitted by a rotating shaft having a magnetostrictive effect section whose magnetic permeability changes when torque is applied, and detecting the change in magnetic permeability of the magnetostrictive effect section when torque is applied as a change in the inductance of a detection coil.

In general, the change in magnetic permeability of the magnetostrictive effect section due to fluctuation in torque is very small, and therefore, measures are usually taken to improve the measurement sensitivity. As one method, a method using a bridge circuit 100 as illustrated in FIG. 8 is conventionally known.

In this method, for example, four detection coils, a first detection coil 103, a second detection coil 104, a third detection coil 105, and a fourth detection coil 106, are arranged around a magnetostrictive effect section 102 having a columnar shape that is a part in the axial direction of a rotating shaft 101 as illustrated in FIG. 9, and a bridge circuit 100 is configured in which the four detection coils are arranged on four sides thereof.

When a torque T is applied to the rotating shaft 101, stresses a with different positive and negative signs act on an outer peripheral surface of the magnetostrictive effect section 102 in directions inclined +45° and −45° with respect to the axial direction. Due to an inverse magnetostriction effect, the magnetic permeability increases in a direction in which the tensile stress (+σ) acts, and decreases in the direction in which the compressive stress (−σ) acts.

In the bridge circuit 100, the first detection coil 103 and the third detection coil 105 arranged as one set of two sets of opposite sides of the four sides are arranged on the outer peripheral surface of the magnetostrictive effect section 102, and are detection coils for detecting a change in magnetic permeability in a direction inclined +45° with respect to the axial direction, and the second detection coil 104 and the fourth detection coil 106 arranged as another set of two sets of opposite sides are arranged on the outer peripheral surface of the magnetostrictive effect section 102, and are detection coils for detecting a change in magnetic permeability in a direction inclined −45° with respect to the axial direction.

In such a bridge circuit 100, when an input voltage Vi is applied between two end points, points A and C, an output voltage Vo corresponding to a direction and a magnitude of torque T applied to the rotating shaft 101 is obtained as voltage between two midpoints, points B and D. Therefore, the torque T can be measured based on the output voltage Vo.

By using the bridge circuit 100 as described above, it is possible to measure the torque T with twice the sensitivity as compared with a case in which torque T is measured by detecting only the change in magnetic permeability in one of the +45° inclined direction and −45° inclined direction with respect to the axial direction.

Incidentally, in the detection coils 103 to 106 of the bridge circuit 100, the resistance values R1 to R4 change according to temperature fluctuations. Therefore, from an aspect of improving the accuracy of torque measurement, it is desirable to provide a method for correcting temperature.

Conventionally, a technique has been known in which an amplification correction circuit is provided to convert output voltage of the bridge circuit into a torque value, sensor temperature information estimated based on an amount of current of the entire bridge circuit is added to this amplification correction circuit, and temperature correction is performed using the sensor temperature information and correction parameters obtained in advance from a calibration test (for example, refer to JP 2018-048956 A).

SUMMARY

In order to mass-produce and ship a torque measuring device that uses a conventional method for temperature correction, during the manufacturing process, it is necessary to perform a calibration test for determining correction parameters for each torque measuring device to be manufactured. For example, in a torque measuring device as described in JP2018-048956 A, it is necessary to perform a calibration test to identify the curve of the graph illustrated in FIG. 6 of that publication, that is, the curve representing the relationship between temperature and $\Delta V$ cos and $\Delta V$ sin.

The reason why it is necessary to perform such a calibration test for each torque measuring device to be manufactured is that the resistance values of the resistors on the four sides of the bridge circuit differ in each torque measuring device.

Referring to FIG. 6 of JP 2018-048956 A, for example, the calibration test is performed over a range of −60° C. to 140° C. When doing this, it is not possible to directly measure the temperature of the bridge circuit of the torque measuring device, and thus it is considered necessary to place the torque measuring device in a test chamber, regard the temperature of the test chamber as the temperature of the torque measuring device, and raise and lower the temperature of the test chamber to perform the calibration test.

The temperature at which the calibration test is performed, instead of being changed in steps of 1° C., for efficiency, the temperature is changed in steps of, for example, 10° C. or 50° C., and after each temperature change, the voltage ($\Delta V$ cos, $\Delta V$ sin) values are measured, and the measurement values in between are considered to complement the correction parameters, assuming a linear progression. In any case, since it takes a certain amount of time to keep the temperature of the test chamber constant at each step, it is a laborious and time-consuming task.

In addition, it is difficult for a worker to enter a test room that exceeds 100° C., and thus it is considered that a worker will put on a protective suit with heat insulating material and enter the test room to measure the voltage value, or the voltage value will be measured using a manipulator by remote control; however, either way, a lot of work is required.

It is conceivable for the calibration test to be performed on several torque measuring devices at one time; however, when the number of devices to be measured is increased, the test chamber must be large and temperature control becomes difficult. Further, when a large number of torque measuring devices are packed into a narrow test chamber, it becomes difficult to make the temperature of each torque measuring device uniform. For this reason, it is considered that the number of units that can be collectively subjected to the calibration test is limited, and thus it becomes difficult to secure a sufficient production quantity per day.

An object of the present disclosure is to provide a torque measuring device and a manufacturing method thereof that are able to simplify calibration tests for determining correction parameters and reduces manufacturing time.

In a method for manufacturing a torque measuring device according to an aspect of the present disclosure, the torque measuring device to be manufactured includes a sensor portion, an oscillator, a voltage measuring portion, and a torque calculating portion.

The sensor portion has a bridge circuit in which four detection coils arranged around a magnetostrictive effect section of a rotating shaft are arranged on four sides.

The oscillator applies an input voltage to two end points of the bridge circuit.

The voltage measuring portion measures an output voltage that is a voltage between two midpoints of the bridge circuit.

The torque calculating portion uses the output voltage measured by the voltage measuring portion to calculate torque applied to the rotating shaft.

Furthermore, the torque calculating portion has a temperature measurement function that measures a temperature of the sensor portion; a function of performing temperature correction of the output voltage measured by the voltage measuring portion using the temperature of the sensor portion measured by the temperature measurement function, and a temperature change rate $V_T$ of the output voltage, which is a correction parameter stored in advance in the torque calculating portion; and a function of calculating torque applied to the rotating shaft based on an output voltage after the temperature correction.

The manufacturing method of a torque measuring device according to an aspect of the present disclosure includes a first step and a second step.

The first step is a step of performing testing of a plurality of test samples having the same configuration as the torque measuring device to be manufactured to find a coil balance $C_b$ that is a ratio $(R1 \times R3)/(R2 \times R4)$ of a product $R1 \times R3$ of resistance values R1 and R3 of two opposite sides forming one pair of opposite sides of the four sides, and a product $R2 \times R4$ of resistance values R2 and R4 of two opposite sides forming another pair of opposite sides of the four sides, and the temperature change rate $V_T$, and acquiring a relationship X between the coil balance $C_b$ and the temperature change rate $V_T$ from the test results.

The second step is a step of measuring the resistance values R1, R2, R3, and R4 of each of the four sides to find the coil balance $C_b$, and using the found coil balance $C_b$ to find the temperature change rate $V_T$ from the relationship X acquired in the first step for the torque measuring device to be manufactured.

A manufacturing method of a torque measuring device according to an aspect of the present disclosure includes a third step of storing the temperature change rate $V_T$ obtained in the second step in the torque calculating portion of the torque measuring device to be manufactured.

A torque measuring device according to an aspect of the present disclosure is a torque measuring device to be manufactured, wherein a recording medium on which the temperature change rate $V_T$ is recorded is attached to the exterior of the sensor portion.

With a torque measuring device and a manufacturing method thereof according to an aspect of the present disclosure, the manufacturing time of the torque measuring device can be reduced.

BRIEF DESCRIPTION OF THE DRAWINGS

To assist those of ordinary skill in the relevant art in making and using the Subject matter hereof, reference is made to the appended drawings, in which like reference numerals refer to similar elements.

It should be understood that the drawings are not to scale and that the disclosed embodiments are sometimes illustrated diagrammatically and in partial views. In certain instances, details that are not necessary for an understanding of the disclosed method and apparatus, or that would render other details difficult to perceive may have been omitted. It should be understood that this disclosure is not limited to the particular embodiments illustrated herein.

DETAILED DESCRIPTION

In the following detailed description of some embodiments, reference is made to the accompanying drawings, which form a part hereof, and within which are shown by way of illustration specific embodiments by which the disclosure may be practiced. It is to be understood that other embodiments may be utilized, and structural changes may be made without departing from the scope of the disclosure.

First Example

A first example of an embodiment of the present disclosure will be described with reference to FIGS. 1 to 7.

Figure 1:
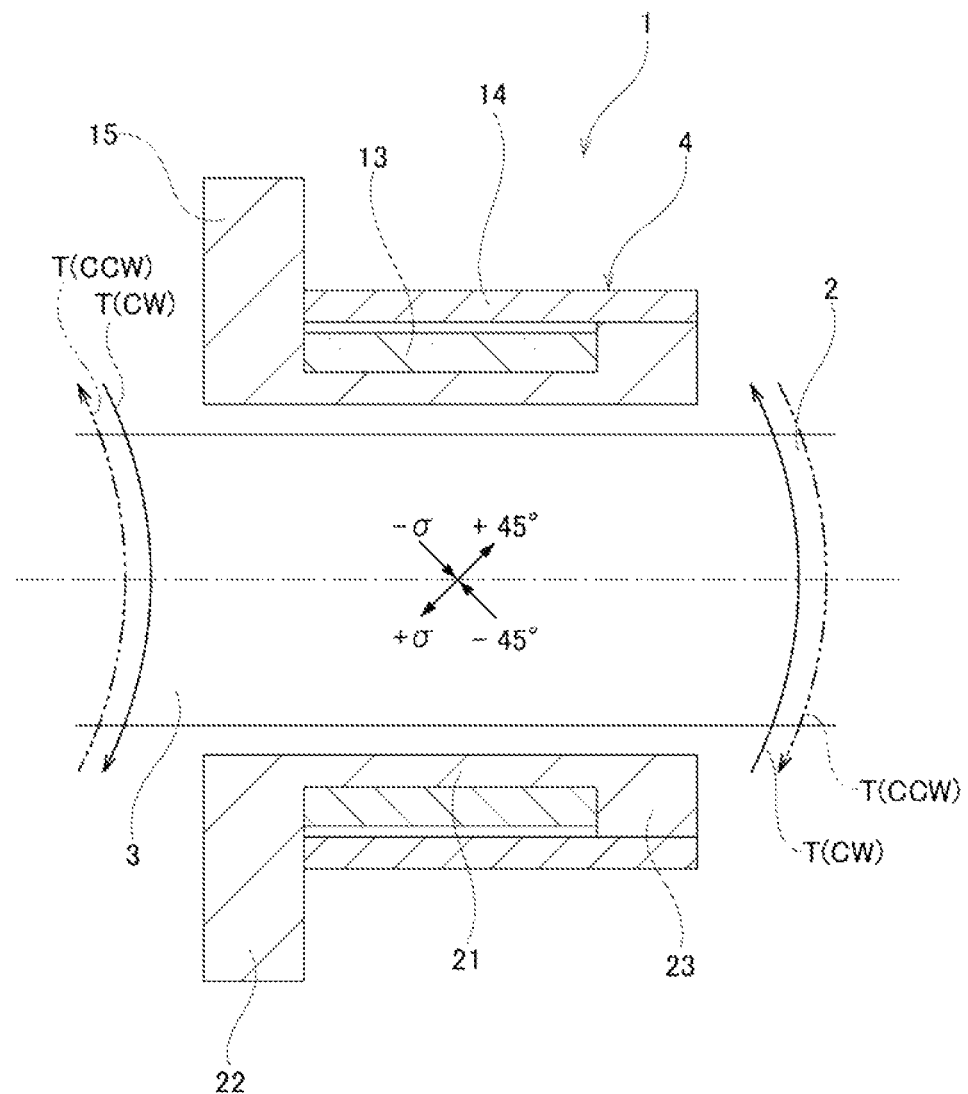
FIG. 1 is a cross-sectional view of a sensor portion of a torque measuring device according to a first example of an embodiment of the present disclosure.
Figure 2:
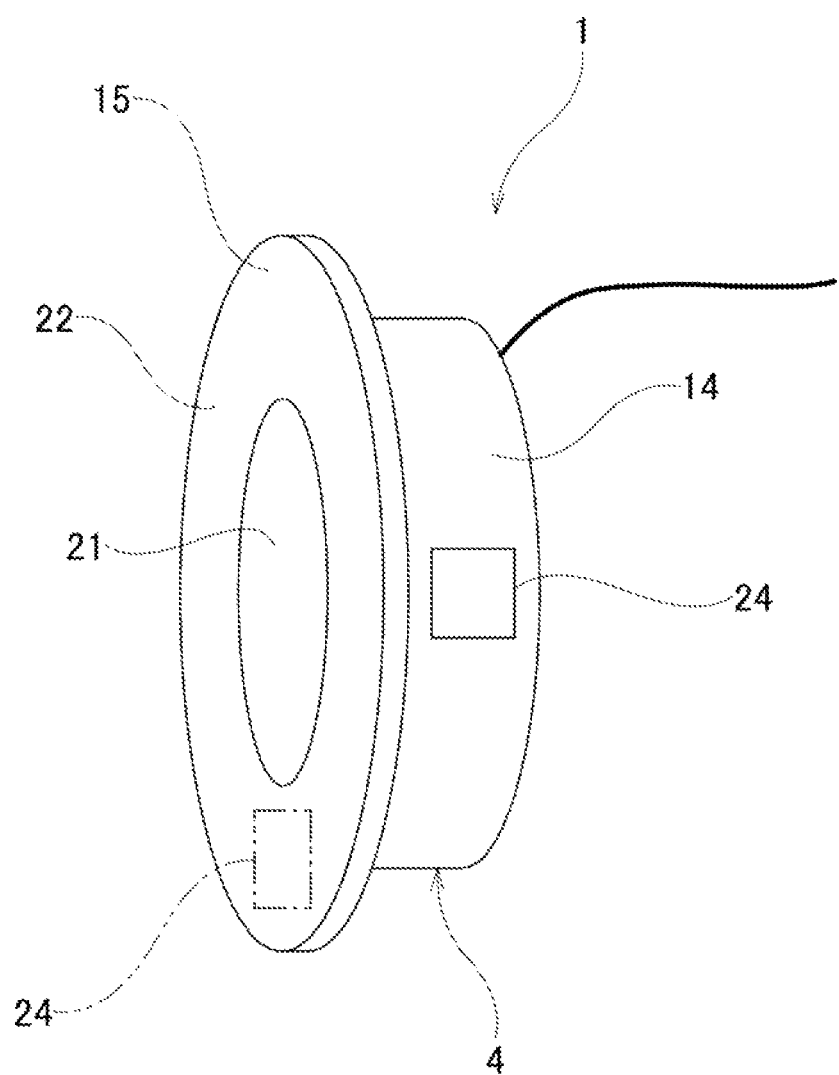
FIG. 2 is a perspective view of the sensor portion of the torque measuring device of the first example.

FIG. 1 and FIG. 2 are diagrams illustrating the structure of a sensor portion 4 of a torque measuring device 1 of this example. A torque measuring device 1 of this example is a device for measuring the torque transmitted by a rotating shaft 2, and can be used by being incorporated in various mechanical devices.

Specific examples of a mechanical device incorporating the torque measuring device 1 of the present example include: a mechanical device of a power train of an automobile, for example, a transmission such as an automatic transmission (AT), a belt-type continuously variable transmission, a toroidal type continuously variable transmission, an automatic manual transmission (AMT), a dual clutch transmission (DCT) or the like that performs gear shifting that is controlled on the vehicle side; or a transfer, a manual transmission (MT), or the like. The driving system of the target vehicle is not particularly limited and may be FF, FR, MR, RR, 4WD, or the like.

Specific examples of the other mechanical devices incorporating the torque measuring device 1 of the present example include devices that change a rotation speed of a power shaft with gears such as a speed reducer or a speed increaser of a wind turbine, a railway vehicle, a rolling mill for steel, and the like.

In this example, the rotating shaft 2 is a rotating shaft incorporated in a mechanical device of a power train as described above, and is rotatably supported by a rolling bearing (not illustrated) with respect to a casing (not illustrated) that does not rotate during use, and has a magnetostrictive effect section, the magnetic permeability of which changes according to torque to be transmitted.

The rotating shaft 2 has an intermediate shaft portion 3 at an intermediate portion in the axial direction thereof as illustrated in FIG. 1. An outer peripheral surface of the intermediate shaft portion 3 is configured by a cylindrical surface. In this example, the intermediate shaft portion 3 of the rotating shaft 2 functions as a magnetostrictive effect section. For this reason, the rotating shaft 2 is made of a magnetic metal. As the magnetic metal forming the rotating shaft 2, various magnetic steels can be used such as carburized steel such as SCr420 and SCM420, and carbon steel such as S45C, which are defined in the Japanese Industrial Standards (JIS).

When a torque T is applied to the rotating shaft 2, stresses a with differing positive and negative signs act on the outer peripheral surface of the intermediate shaft portion 3 in directions inclined +450 and −45° with respect to the axial direction. Due to an inverse magnetostriction effect, the magnetic permeability increases in a direction in which the tensile stress (+σ) acts, and decreases in the direction in which the compressive stress (−σ) acts.

When carrying out the present disclosure, it is possible to improve the mechanical and magnetic properties of a portion of the outer peripheral surface of the intermediate shaft portion 3 arranged at an inner side in the radial direction of the sensor portion 4 by subjecting the portion to a shot peening process to form a compression work hardened layer. In this way, sensitivity and hysteresis of torque measurement by the torque measuring device 1 may be improved.

When carrying out the present disclosure, instead of having the intermediate shaft portion 3 function as the magnetostrictive effect section, it is also possible to fix a magnetostrictive material functioning as the magnetostrictive effect section to an outer peripheral surface of the intermediate shaft portion 3. More specifically, an annular-shaped magnetostrictive material may be fitted around the intermediate shaft portion 3 and fixed, or a magnetostrictive material composed of a film coating such as plating or a film-like magnetostrictive material may be fixed to the outer peripheral surface of the intermediate shaft portion 3.

The sensor portion 4 illustrated in FIG. 1 has an annular shape as a whole, and is supported and fixed to the casing while being arranged coaxially around the intermediate shaft portion 3. In this example, the sensor portion 4 includes a coil unit 13, a back yoke 14, and a holder 15.

In this example, the coil unit 13 is formed into a cylindrical shape by a flexible substrate (FPC) 16 (see FIG. 3A and FIG. 3B) including a base film and printed wiring (conductors) held on the base film, and is arranged coaxially around the intermediate shaft portion 3 of the rotating shaft 2. The flexible substrate (FPC) 16 has a first detection coil 9, a second detection coil 10, a third detection coil 11 and a fourth detection coil 12 as illustrated in FIG. 4 and FIGS. 5A to 5D.

Figure 3A:
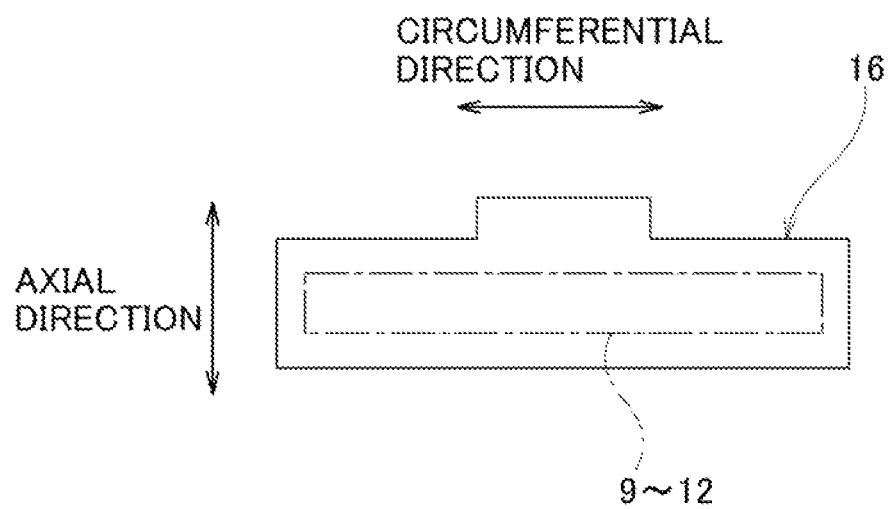
FIG. 3A is a developed view of a flexible substrate of a coil unit of the torque measuring device of the first example.
Figure 3B:
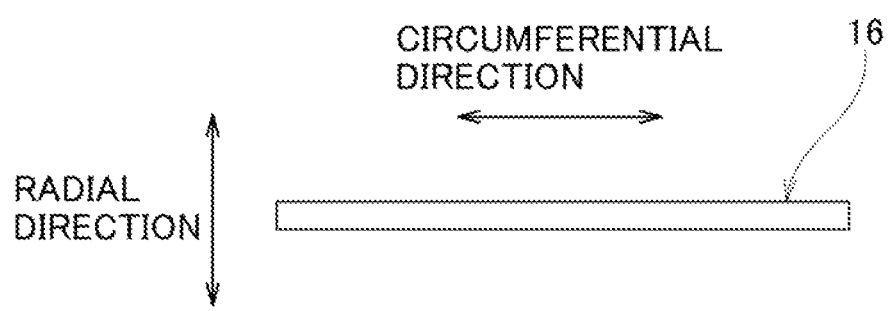
FIG. 3B is a view of the flexible substrate viewed from below in FIG. 3A.

More specifically, in this example, the coil unit 13 is configured by rolling the band-shaped flexible substrate 16 into a cylindrical shape as illustrated in FIG. 3A and FIG. 3B, and joining both end portions in the length direction, for example, by bonding.

The flexible substrate 16 has four wiring layers that are layered in the thickness direction, and the first detection coil 9, the second detection coil 10, the third detection coil 11, and the fourth detection coil 12, each of which is configured by printed wiring, are arranged on these wiring layers.

In a state that the band-shaped flexible substrate 16 is rolled into a cylindrical shape, that is, in a state that the cylindrical coil unit 13 is formed, the detection coils 9 to 12 are arranged in order of the first detection coil 9, the second detection coil 10, the fourth detection coil 12, and the third detection coil 11 from the inner side in the radial direction.

Figure 4:
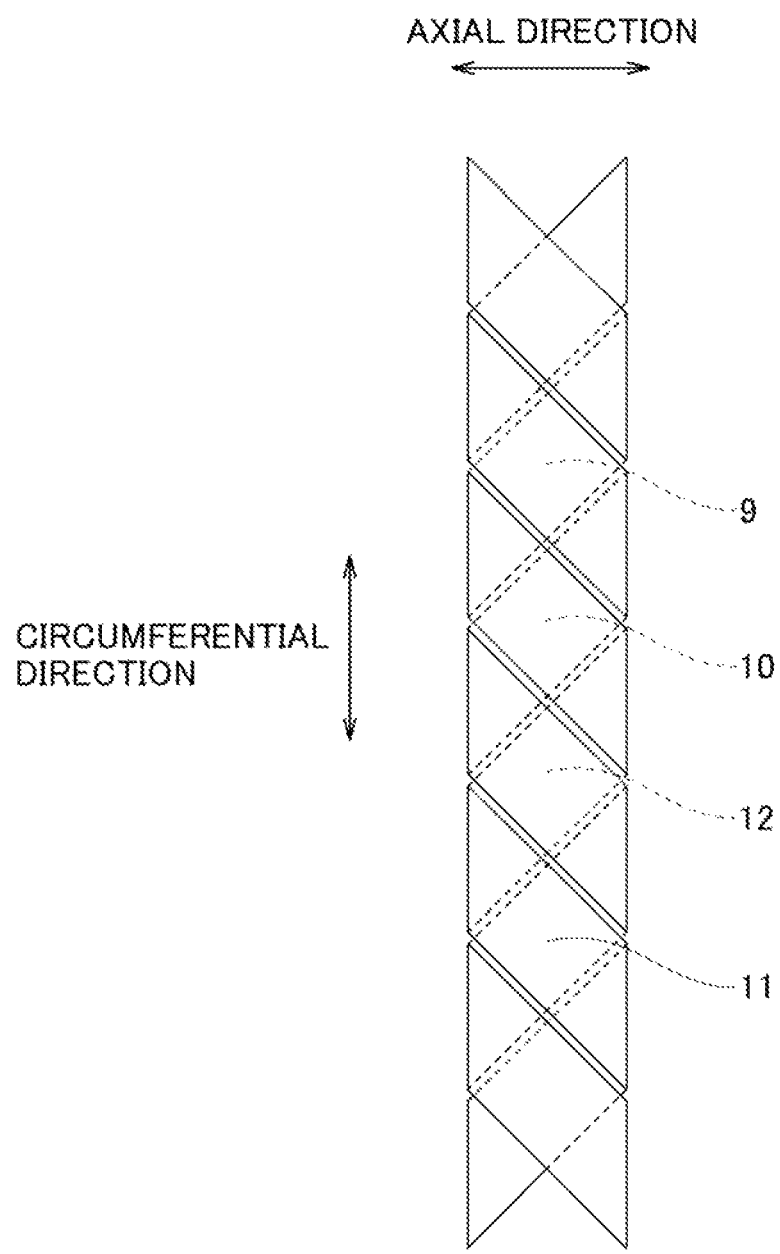
FIG. 4 is a developed view of a first detection coil, a second detection coil, a third detection coil, and a fourth detection coil of the coil unit of the torque measuring device of the first example, as viewed from the outside in the radial direction.
Figure 5:
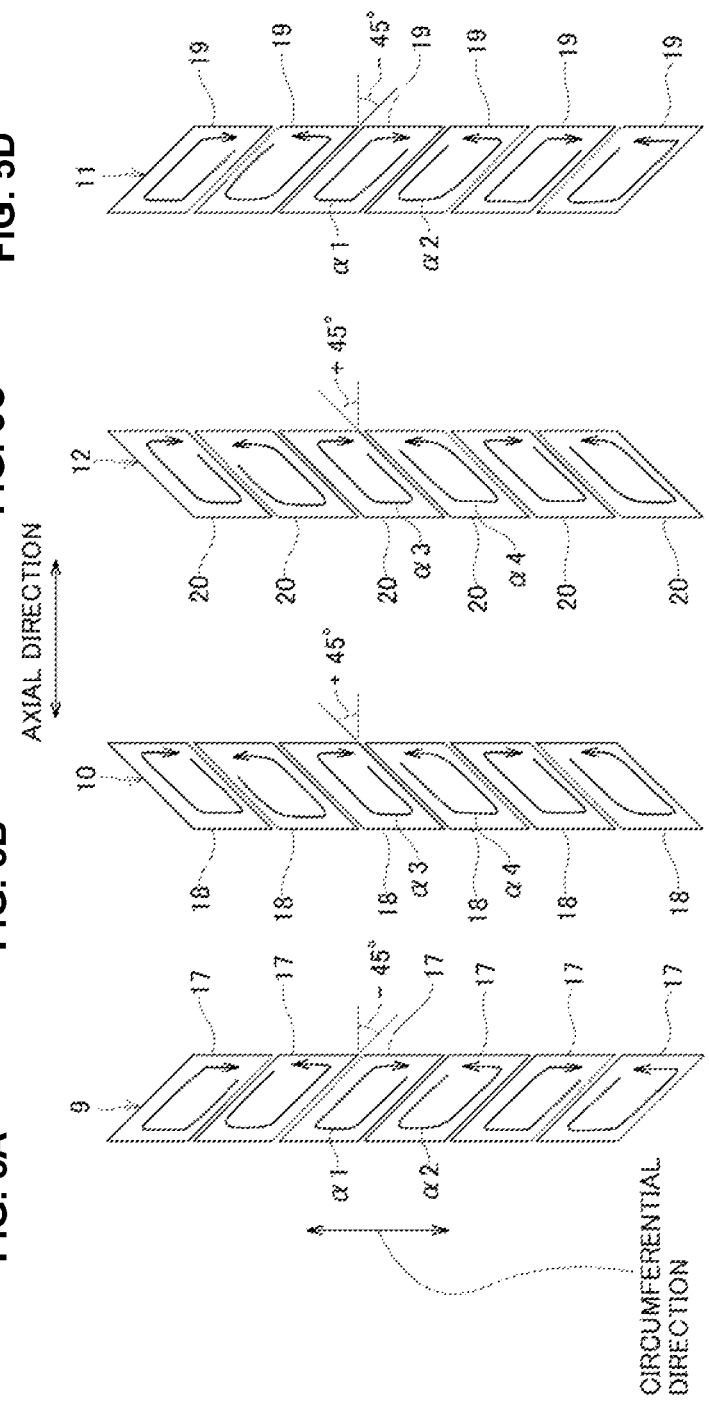
FIG. 5A to FIG. 5D are developed views of a first detection coil, a second detection coil, a third detection coil, and a fourth detection coil of the coil unit of the torque measuring device of the first example, and are developed views of each single unit viewed from the outside in the radial direction.

FIG. 4 illustrates a developed view of the first detection coil 9, the second detection coil 10, the third detection coil 11, and the fourth detection coil 12 as seen from the outer side in the radial direction of the coil unit 13. FIG. 5A to FIG. 5D illustrate developed views of the detection coils 9 to 12 in a single state as seen from the outside in the radial direction of the coil unit 13.

The first detection coil 9 is a detection coil for detecting a change in magnetic permeability on the outer peripheral surface of the intermediate shaft portion 3 in a direction inclined +45° with respect to the axial direction, or in other words, is a detection coil that changes its own inductance L1 as the magnetic permeability in that direction changes.

As illustrated in FIG. 5A, the first detection coil 9 includes a plurality of coil pieces 17 arranged side by side at equal pitches in the circumferential direction. These coil pieces 17 have a parallelogram shape when viewed from the radial direction, and include wiring that is inclined −45° with respect to the axial direction of the intermediate shaft portion 3. Coil pieces 17 that are adjacent in the circumferential direction are connected in series by a conductor such as printed wiring (not illustrated).

In FIG. 5A, the coil pieces 17 are schematically illustrated, and illustrated as if the entire circumference is connected; however, actually, discontinuous portions exist in a part of the coil pieces 17 in the circumferential direction.

The coil pieces 17 have two end portions that are separated across discontinuous portions. Coil pieces 17 that are adjacent in the circumferential direction are connected in series by connecting one end portion of each with a conductor such as printed wiring (not illustrated). These aspects are the same for the second detection coil 10 to the fourth detection coil 12 below.

The second detection coil 10 is a detection coil for detecting a change in magnetic permeability on the outer peripheral surface of the intermediate shaft portion 3 in a direction inclined −45° with respect to the axial direction, or in other words, is a detection coil that changes its own inductance L2 as the magnetic permeability in that direction changes.

As illustrated in FIG. 5B, the second detection coil 10 includes a plurality of coil pieces 18 arranged side by side at equal pitches in the circumferential direction. These coil pieces 18 have a parallelogram shape when viewed from the radial direction, and include wiring that is inclined +450 with respect to the axial direction of the intermediate shaft portion 3. Coil pieces 18 that are adjacent in the circumferential direction are connected in series by a conductor such as printed wiring (not illustrated).

The third detection coil 11 is a detection coil for detecting a change in magnetic permeability on the outer peripheral surface of the intermediate shaft portion 3 in a direction inclined +45° with respect to the axial direction, or in other words, is a detection coil that changes its own inductance L3 as the magnetic permeability in that direction changes.

As illustrated in FIG. 5D, the third detection coil 11 includes a plurality of coil pieces 19 arranged side by side at equal pitches in the circumferential direction. These coil pieces 19 have a parallelogram shape when viewed from the radial direction, and include wiring that is inclined −45° with respect to the axial direction of the intermediate shaft portion 3. Coil pieces 19 that are adjacent in the circumferential direction are connected in series by a conductor such as printed wiring (not illustrated).

The fourth detection coil 12 is a detection coil for detecting a change in magnetic permeability on the outer peripheral surface of the intermediate shaft portion 3 in a direction inclined −45° with respect to the axial direction, or in other words, is a detection coil that changes its own inductance L4 as the magnetic permeability in that direction changes.

As illustrated in FIG. 5C, the fourth detection coil 12 includes a plurality of coil pieces 20 arranged side by side at equal pitches in the circumferential direction. These coil pieces 20 have a parallelogram shape when viewed from the radial direction, and include wiring that is inclined +450 with respect to the axial direction of the intermediate shaft portion 3. Coil pieces 20 that are adjacent in the circumferential direction are connected in series by a conductor such as printed wiring (not illustrated).

However, when carrying out the present disclosure, configuration regarding the specific shape and arrangement of the first detection coil, the second detection coil, the third detection coil, and the fourth detection coil is not limited to the configuration of this example, and various conventionally known configurations may be adopted.

The back yoke 14 is a member that forms a magnetic path for magnetic fluxes generated by the first detection coil 9, the second detection coil 10, the third detection coil 11, and the fourth detection coil 12. The back yoke 14 is made of a magnetic material such as mild steel and is formed in a cylindrical shape as a whole. The back yoke 14 is arranged coaxially around the coil unit 13.

In this example, in this state, a clearance in the radial direction is provided along the axial direction between the coil unit 13 and the back yoke 14. That is, an outer peripheral surface of the coil unit 13 and an inner peripheral surface of the back yoke 14 are separated in the radial direction.

The holder 15 is a member that holds the coil unit 13 and the back yoke 14, and is made of a non-magnetic material and has an annular shape as a whole.

In this example, the holder 15 has a cylindrical holder cylindrical portion 21, a first outward-facing flange 22 extending outward in the radial direction over the entire circumference from an end portion on one side in the axial direction (left side in FIG. 1) of the holder cylindrical portion 21, and a second outward-facing flange 23 extending outward in the radial direction over the entire circumference from an end portion on the other side in the axial direction (right side in FIG. 1) of the holder cylindrical portion 21. The outer diameter of the first outward-facing flange 22 is larger than the outer diameter of the second outward-facing flange 23.

The holder 15 is supported and fixed to the casing while being arranged coaxially around the intermediate shaft portion 3.

In this example, the coil unit 13 is fitted onto an intermediate portion in the axial direction of the holder cylindrical portion 21, that is, in a portion of the holder cylindrical portion 21 that is positioned in the axial direction between the first outward-facing flange 22 and the second outward-facing flange 23. An end surface of the back yoke 14 on the one side in the axial direction is in contact with an intermediate portion in the radial direction of a side surface on the other side in the axial direction of the first outward-facing flange 22, and an inner peripheral surface of an end portion on the other side in the axial direction of the back yoke 14 is fitted onto an outer peripheral surface of the second outward-facing flange 23 by an interference fit or the like.

Note that when carrying out the present disclosure, a configuration different from that of this example can be employed for the coil unit that includes the first detection coil 9, the second detection coil 10, the third detection coil 11, and the fourth detection coil 12; the back yoke arranged around the coil unit; the holder that holds the coil unit and back yoke; and the like.

Figure 6:
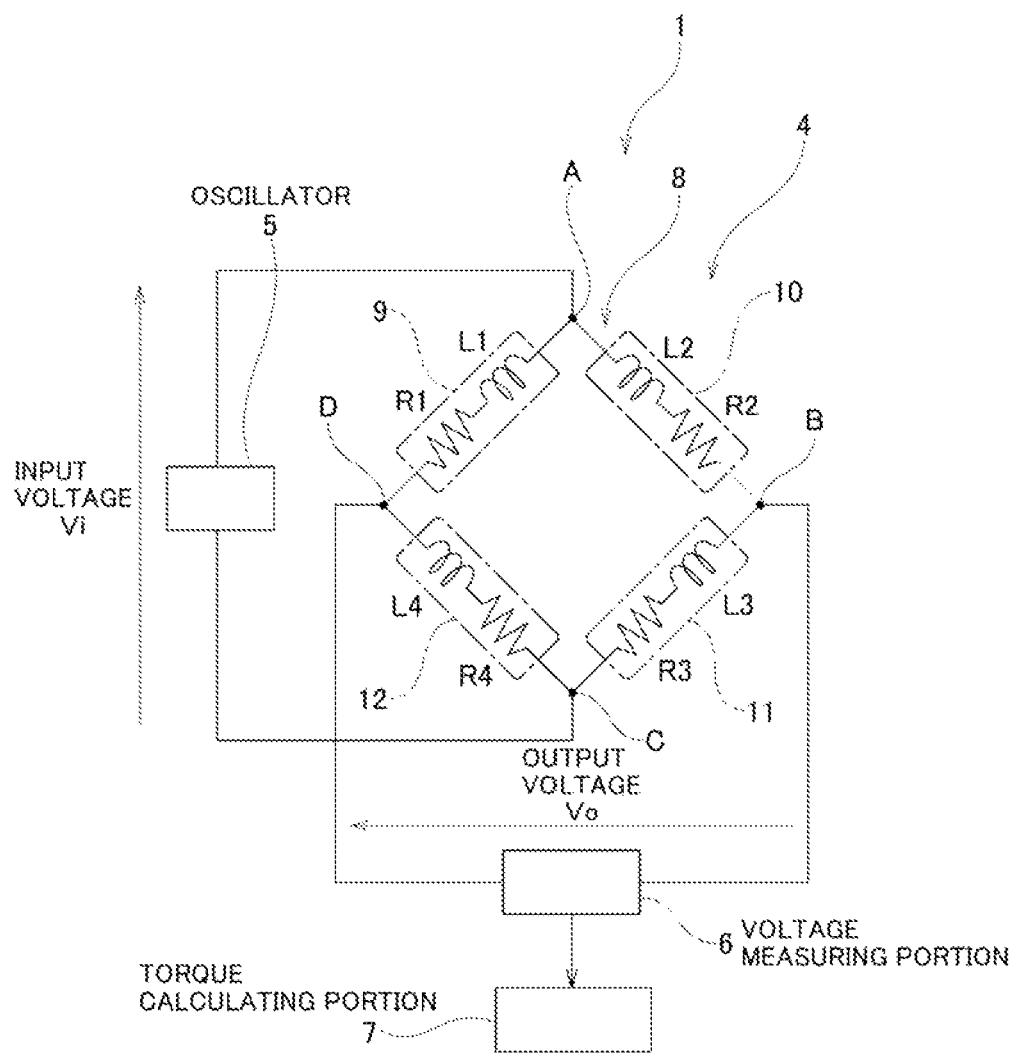
FIG. 6 is a schematic circuit diagram of the torque measuring device of the first example.

FIG. 6 is a schematic circuit diagram of the torque measuring device 1 of the present example. The torque measuring device 1 of this example includes the sensor portion 4, an oscillator 5, a voltage measuring portion 6, and a torque calculating portion 7. In this example, of the elements of the schematic circuit configuration diagram illustrated in FIG. 6, the elements other than the detection coils 9 to 12 are, for example, fixed to the flexible substrate 16 or fixed to another substrate (not illustrated), for example, a substrate installed on a side of a vehicle body.

In the sensor portion 4, a bridge circuit 8 is configured in which four detection coils, the first detection coil 9, the second detection coil 10, the third detection coil 11, and the fourth detection coil 12, are arranged on four sides thereof. That is, the bridge circuit 8 has two end points, point A and point C, and two midpoints, point B and point D.

The first detection coil 9 is arranged on the side between point D and point A. The second detection coil 10 is arranged on the side between point A and point B. The third detection coil 11 is arranged on the side between point B and point C. The fourth detection coil 12 is arranged on the side between point C and point D.

In the bridge circuit 8, the first detection coil 9 and the third detection coil 11, which are detection coils for detecting a change in magnetic permeability in a direction inclined +450 with respect to the axial direction, are arranged on the outer peripheral surface of the intermediate shaft portion 3 on a side between point D and point A and on a side between the point B and point C, which are opposite sides of one of the two pairs of opposite sides of the four sides.

Moreover, the second detection coil 10 and the fourth detection coil 12, which are detection coils for detecting a change in magnetic permeability in a direction inclined −45° with respect to the axial direction, are arranged on the outer peripheral surface of the intermediate shaft portion 3 on a side between point A and point B and a side between point C and point D, which are opposite sides of the other pair of the two pairs of opposite sides.

The oscillator 5 can apply an input voltage Vi, which is an AC voltage, between the two end points, point A and Point C, of the bridge circuit 8.

The voltage measuring portion 6 can measure the output voltage Vo, which is the voltage between the two midpoints, point B and point D, of the bridge circuit 8.

That is, when using the torque measuring device 1 of this example, the oscillator 5 applies an input voltage Vi between point A and point C, which are two end points of the bridge circuit 8, and causes alternating current to flow through the first detection coil 9, the second detection coil 10, the third detection coil 11, and the fourth detection coil 12, and as a result, as indicated by arrows α1, α2, α3, and α4 in FIG. 5A to FIG. 5D, currents flow in mutually opposite directions between the coil pieces 17, 18, 19, and 20 adjacent in the circumferential direction in the first detection coil 9, the second detection coil 10, the third detection coil 11, and the fourth detection coil 12.

In other words, pairs of coil pieces 17, 18, 19, and 20 adjacent in the circumferential direction are connected to each other so that the currents flow in such directions. As a result, an alternating magnetic field is generated around the first detection coil 9, the second detection coil 10, the third detection coil 11, and the fourth detection coil 12, and part of the magnetic flux of this alternating magnetic field passes through a surface layer portion of the intermediate shaft portion 3.

In this state, when a torque T in a direction indicated by arrow CW in FIG. 1 is applied to the intermediate shaft portion 3, a tensile stress (+σ) in the +450 direction with respect to the axial direction and a compressive stress (−σ) in the −45° direction with respect to the axial direction act on the rotating shaft 2. Then, due to an inverse magnetostriction effect, the magnetic permeability of the intermediate shaft portion 3 increases in the +45° direction, which is the direction in which the tensile stress (+σ) acts, and the magnetic permeability of the intermediate shaft portion 3 decreases in the −45° direction, which is the direction in which the compressive stress (−σ) acts.

On the other hand, the first detection coil 9 and the third detection coil 11 are configured to include wiring inclined −45° with respect to the axial direction of the intermediate shaft portion 3, and part of the magnetic flux of the alternating magnetic field generated around the wiring passes through the surface layer of the intermediate shaft portion 3 in the +45° direction, which is the direction in which the magnetic permeability increases. Therefore, the inductances L1 and L3 of the first detection coil 9 and the third detection coil 11 increase, respectively.

In addition, the second detection coil 10 and the fourth detection coil 14 are configured to include wiring inclined +45° with respect to the axial direction of the intermediate shaft portion 3, and part of the magnetic flux of the alternating magnetic field generated around the wiring passes through the surface layer of the intermediate shaft portion 3 in the −45° direction, which is the direction in which the magnetic permeability decreases. Therefore, the inductances L2 and L4 of the second detection coil 10 and the fourth detection coil 12 decrease, respectively.

In contrast, when a torque T in the direction indicated by the arrow CCW in FIG. 1 is applied to the intermediate shaft portion 3, by the action opposite to the case described above, the inductances L1 and L3 of the first detection coil 9 and the third detection coil 11 decrease, and the inductances L2 and L4 of the second detection coil 10 and the fourth detection coil 12 increase.

In any case, in the bridge circuit 8, an output voltage Vo corresponding to the direction and magnitude of the torque T applied to the rotating shaft 2 is obtained as the voltage between the two midpoints, point B and point D. In this example, the voltage measuring portion 6 is able to measure the output voltage Vo.

The torque calculating portion 7 has a function of using the output voltage Vo measured by the voltage measuring portion 6 to calculate the torque T applied to the rotating shaft 2.

The torque calculating portion 7 has a temperature measurement function of measuring a temperature of the sensor portion 4, and specifically, an amount of temperature change ΔT in the sensor portion 4 based on a preset reference temperature Ta. When carrying out the present disclosure, it is possible to adopt various conventionally known configurations as a configuration to achieve this temperature measurement function, and more specifically, it is possible to adopt a configuration that measures an amount of temperature change ΔT of the sensor portion 4 by processing an amount of current of the entire bridge circuit 8 by software (for example, refer to JP 2018-048956 A), or a configuration including a thermocouple, a temperature sensor, or the like for physically measuring the amount of temperature change ΔT of the sensor portion 4.

Here, the reference temperature Ta can be set to any temperature, for example, normal room temperature (about 20° C.).

The torque calculating portion 7 stores in advance a temperature change rate $V_T$ of the output voltage of the bridge circuit 8, which is a correction parameter. This temperature change rate $V_T$ is the rate of change of the output voltage due to the temperature change of the sensor portion 4, and more specifically, is a rate that indicates by what percentage the output voltage deviates each time the temperature of the sensor portion 4 changes by 1° C.

The torque calculating portion 7 has a function of using the amount of temperature change ΔT of the sensor portion 4 measured by the temperature measurement function and the temperature change rate $V_T$ stored in advance to perform temperature correction of the output voltage Vo measured by the voltage measurement unit 6. That is, in a case where the current temperature of the sensor portion 4 deviates from the reference temperature Ta by the amount of temperature change ΔT, the torque calculating portion 7 has a function of correcting the amount of deviation (ΔV) in the output voltage of the bridge circuit 8 caused by this deviation.

For this reason, in this example, the torque calculating portion 7 multiplies the amount of temperature change ΔT of the sensor portion 4 measured by the temperature measurement function by the temperature change rate $V_T$, that is, $\Delta V = \Delta T \times V_T$ to obtain the amount of temperature change of deviation ($\Delta V$). Then, by subtracting the obtained amount of deviation ($\Delta V$) from the output voltage Vo measured by the voltage measuring portion 6, an output voltage Va (=Vo−$\Delta V$) that is estimated to be measured in a case where the temperature of the sensor portion 4 is the reference temperature Ta is obtained. That is, the torque calculating portion 7 corrects the output voltage Vo measured by the voltage measuring portion 6 to the output voltage Va.

The torque calculating portion 7 calculates the torque T applied to the rotating shaft 2 based on the output voltage Va after temperature correction. That is, the torque calculating portion 7 stores in advance a relationship Y between the output voltage of the bridge circuit 8 and the torque T at the reference temperature Ta. The torque calculating portion 7 uses the relationship Y to calculate the torque T from the output voltage Va after temperature correction.

As described above, in this example, the torque calculating portion 7 performs temperature correction of the output voltage Vo of the bridge circuit 8, and since the torque T is calculated based on the output voltage Va after temperature correction, it is easy to ensure the measurement accuracy of the torque T regardless of temperature fluctuations of the sensor portion 4.

In the torque measuring device 1 of this example further includes a recording medium 24 attached to a part of the exterior of the sensor portion 4 and obtained by a manufacturing method of the torque measuring device 1 as described below, on which the temperature change rate $V_T$ is recorded. For example, as indicated by the solid line in FIG. 2, the recording medium 24 can be attached to a part in the circumferential direction of the outer peripheral surface of the back yoke 14. Alternatively, as indicated by the dashed line in FIG. 2, the recording medium 24 can be attached to a side surface in the axial direction of the holder 15. However, the location where the recording medium 24 is attached can be any location as long as the temperature change rate $V_T$ recorded on the recording medium 24 can be read.

Next, a method for manufacturing the torque measuring device 1 of this example will be described.

The manufacturing method of the torque measuring device 1 of this example includes a first step and a second step.

Figure 7:
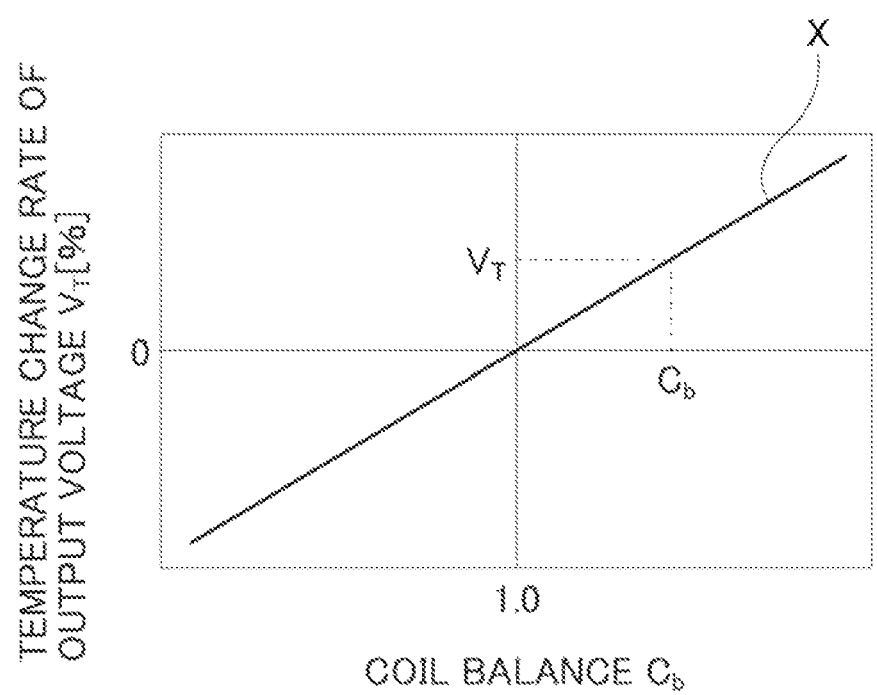
FIG. 7 is a graph illustrating a relationship between the coil balance $C_b$ and the temperature change rate $V_T$ of the output voltage.
Figure 8:
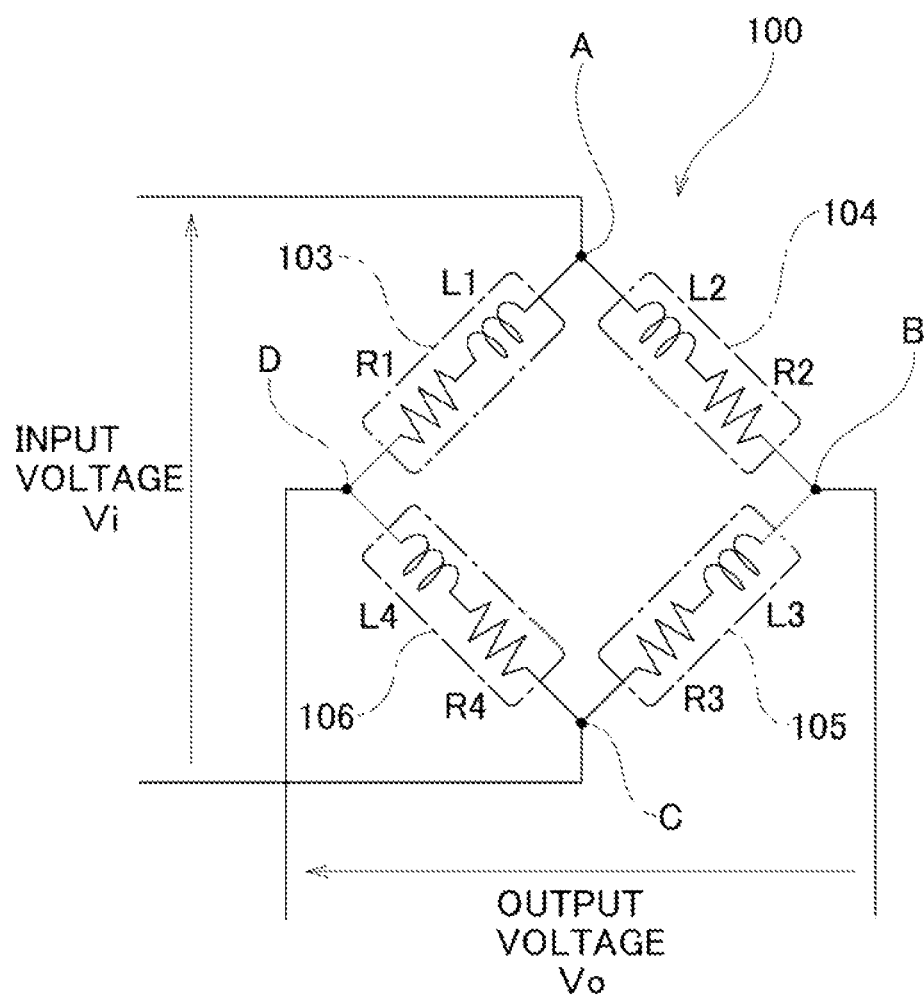
FIG. 8 is a diagram illustrating a bridge circuit of a conventional torque measuring device.
Figure 9:
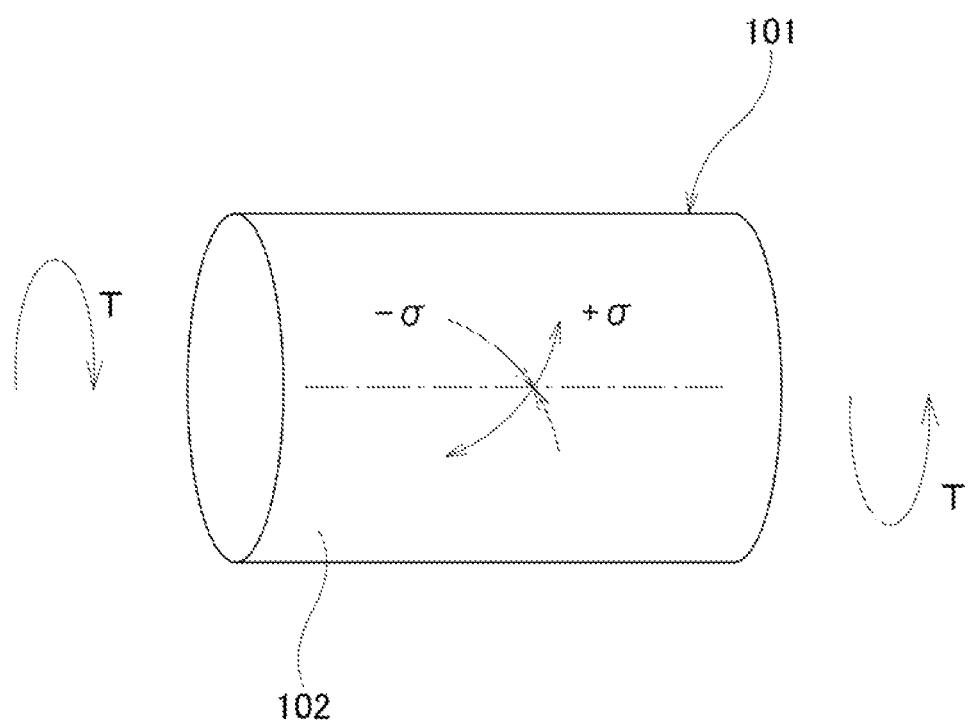
FIG. 9 is a perspective view of a rotating shaft for explaining the direction of stress generated when torque is applied to the rotating shaft.

The first step is a step of obtaining a relationship X with regard to the torque measuring device 1 to be manufactured, which is conceptually represented by a straight line in FIG. 7, and more specifically, a step of acquiring a relationship between a coil balance $C_b$ and the temperature change rate $V_T$ of the output voltage of the bridge circuit 8.

Here, the coil balance $C_b$ is a ratio (R1×R3)/(R2×R4) of a product R1×R3 of resistance values R1 and R3 of two opposite sides forming one pair of opposite sides of the four sides of the bridge circuit 8, and a product R2×R4 of resistance values R2 and R4 of two opposite sides forming another pair of opposite sides of the four sides.

That is, in the first step, a plurality (a large number) of test samples each having the same configuration as the torque measuring device 1 to be manufactured and having different coil balances $C_b$ are prepared. Then, these test samples are tested to find the coil balance $C_b$ and the temperature change rate $V_T$, and the relationship X in FIG. 7 is obtained from the test results.

The second step is a step is to find the temperature change rate $V_T$ for the torque measuring device 1 to be manufactured. That is, in the second step, a measuring device such as an impedance analyzer is used to measure the resistance values of the four sides of the bridge circuit 8, that is, the respective resistance values R1, R2, R3, and R4 of the first detection coil 9, the second detection coil 10, the third detection coil 11, and the fourth detection coil 12, for the torque measuring device 1 to be manufactured.

Then, the coil balance $C_b$ is obtained from the measured resistance values R1, R2, R3, and R4. Using the determined coil balance $C_b$, the temperature change rate $V_T$ corresponding to the coil balance $C_b$ is determined from the relationship X in FIG. 7 obtained in the first step.

Note that the relationship X in FIG. 7 obtained in the first step can be shared for these torque measuring devices 1 when mass-producing the torque measuring devices 1 to be manufactured.

The manufacturing method of the torque measuring device 1 of this example further includes a third step.

The third step is a step of storing the temperature change rate $V_T$ obtained in the second step in the torque calculating portion 7 of the torque measuring device 1 to be manufactured.

When carrying out the present disclosure, the third step can be performed at a manufacturing plant of the torque measuring device 1 or at manufacturing plant of an automobile in which the torque measuring device 1 is to be installed.

In a case where the third step is performed at an automobile manufacturing plant, when shipping the torque measuring device 1 from the manufacturing plant of the torque measuring device 1 to the automobile manufacturing plant, for example, as indicated by solid or dashed lines in FIG. 2, a recording medium 24 such as a two-dimensional bar code or an IC tag that records the temperature change rate $V_T$ obtained in the second step can be attached to a part of the exterior of the torque measuring device 1. Then, when the automobile is manufactured, the temperature change rate $V_T$ recorded on the recording medium 24 is read, and the read temperature change rate $V_T$ is stored in the torque calculating portion 7.

Note that in the example indicated by the solid line in FIG. 2, the recording medium 24 is attached to a part in the circumferential direction of the outer peripheral surface of the back yoke 14, which is a part of the exterior, and in the example indicated by the dashed line in FIG. 2, the recording medium 24 is attached to a side surface in the axial direction of the holder 15, which is part of the exterior. However, the location where the recording medium 24 is attached to the exterior can be any location as long as the temperature change rate $V_T$ recorded on the recording medium 24 can be read.

According to the manufacturing method of the torque measuring device 1 of this example, the manufacturing time can be reduced while at the same time the torque measuring device 1 to be manufactured has a structure having a temperature correction function.

That is, in this example, of the first, second, and third steps included in the method of manufacturing the torque measuring device 1, the first step, which takes a relatively long time, does not need to be performed individually for each of the torque measuring devices 1 when mass-producing the torque measuring devices 1 to be manufactured. In other words, the relationship X in FIG. 7 obtained in the first step can be shared by these torque measuring devices 1.

Then, in the second step, the temperature change rate $V_T$ is automatically found simply by finding the coil balance $C_b$ from the resistance values R1, R2, R3, and R4. Therefore, the manufacturing time of the torque measuring device 1 can be greatly reduced compared to conventional technology, which requires a long and difficult calibration test for each of these torque measuring devices.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting.

It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

REFERENCE SIGNS LIST

1 Torque measuring device
2 Rotating shaft
3 Intermediate shaft portion
4 Sensor portion
5 Oscillator
6 Voltage measuring portion
7 Torque calculating portion
8 Bridge circuit
9 First detection coil
10 Second detection coil
11 Third detection coil
12 Fourth detection coil
13 Coil unit
14 Back yoke
15 Holder
16 Flexible substrate
17 Coil piece
18 Coil piece
19 Coil piece
20 Coil piece
21 Holder cylindrical portion
22 First outward-facing flange
23 Second outward-facing flange
24 Recording medium
100 Bridge circuit
101 Rotating shaft
102 Magnetostrictive effect section
103 First detection coil
104 Second detection coil
105 Third detection coil
106 Fourth detection coil

The invention claimed is:

1. A manufacturing method of a torque measuring device, the torque measuring device comprising:
a sensor portion having a bridge circuit in which four detection coils arranged around a magnetostrictive effect section of a rotating shaft are arranged on four sides;
an oscillator configured to apply an input voltage to two end points of the bridge circuit;
a voltage measuring portion configured to measure an output voltage that is a voltage between two midpoints of the bridge circuit; and
a torque calculating portion configured to calculate torque applied to the rotating shaft using the output voltage measured by the voltage measuring portion;
the torque calculating portion having a temperature measurement function that measures a temperature of the sensor portion; a function of performing temperature correction of the output voltage measured by the voltage measuring portion using the temperature of the sensor portion measured by the temperature measurement function, and a temperature change rate $V_T$ of the output voltage, which is a correction parameter stored in advance in the torque calculating portion; and a function of calculating torque applied to the rotating shaft based on an output voltage after the temperature correction; and
the manufacturing method of the torque measuring device comprising:
a first step of performing testing of a plurality of test samples having the same configuration as the torque measuring device to be manufactured to find a coil balance $C_b$ that is a ratio $(R1{\times}R3)/(R2{\times}R4)$ of a product $R1{\times}R3$ of resistance values R1 and R3 of two opposite sides forming one pair of opposite sides of the four sides, and a product $R2{\times}R4$ of resistance values R2 and R4 of two opposite sides forming another pair of opposite sides of the four sides, and the temperature change rate $V_T$, and acquiring a relationship X between the coil balance $C_b$ and the temperature change rate $V_T$ from the test results; and
a second step of measuring the resistance values R1, R2, R3, and R4 of each of the four sides to find the coil balance $C_b$ for the torque measuring device to be manufactured, and using the found coil balance $C_b$ to find the temperature change rate $V_T$ therefor from the relationship X acquired in the first step.

2. The manufacturing method of a torque measuring device according to claim 1, further comprising a third step of storing the temperature change rate $V_T$ found in the second step in the torque calculating portion of the torque measuring device to be manufactured.

3. A torque measuring device comprising:
a sensor portion having a bridge circuit in which four detection coils arranged around a magnetostrictive effect section of a rotating shaft are arranged on four sides;
an oscillator configured to apply an input voltage to two end points of the bridge circuit;
a voltage measuring portion configured to measure an output voltage that is a voltage between two midpoints of the bridge circuit; and
a torque calculating portion configured to calculate torque applied to the rotating shaft using the output voltage measured by the voltage measuring portion;
the torque calculating portion having a temperature measurement function that measures a temperature of the sensor portion; a function of performing temperature correction of the output voltage measured by the voltage measuring portion using the temperature of the sensor portion measured by the temperature measurement function, and a temperature change rate $V_T$ of the output voltage, which is a correction parameter stored in advance in the torque calculating portion; and a function of calculating torque applied to the rotating shaft based on an output voltage after the temperature correction; and a recording medium on which the temperature change rate $V_T$ is recorded is attached to an exterior of the sensor portion.

\* \* \* \* \*